A. W. STANDING.
RAILWAY TARIFF.
APPLICATION FILED MAR. 21, 1908.

932,827.

Patented Aug. 31, 1909.

*B* — PAGE NO. 13-2, CANCELLING PAGE 13-1

THE .............. .............. RAILWAY CO.

FREIGHT TARIFF No. 1086-A.

| DATE EFFECTIVE OF RATES CHANGED | INDEX NO. | BETWEEN ST. L , MO, AND | | RATES IN CENTS PER HUNDRED POUNDS | | | | | | | | | |
|---|---|---|---|---|---|---|---|---|---|---|---|---|---|
| | | | | MERCHANDISE | | | | | CAR LOADS | | | | |
| | | | | FIRST CLASS | SECOND CLASS | THIRD CLASS | FOURTH CLASS | FIFTH CLASS | CLASS A | CLASS B | CLASS C | CLASS D | CLASS E |
| | | EVEREST | KAN. | 60 | 45 | 35 | 27 | | | | | | |
| | | WILLIS | " | 60 | 45 | 35 | 27 | | | | | | |
| | | BAKER | " | 60 | 45 | 35 | 27 | | | | | | |
| | | HIAWATHA | " | 60 | 45 | 35 | 27 | | | | | | |
| | | PADONIA | " | 60 | 45 | 35 | 27 | | | | | | |
| 11-10-07 | | RESERVE | " | †63 | 47 | 37 | 29 | | | | | | |
| | | FALLS CITY | NEB. | 60 | 45 | 35 | 27 | | | | | | |
| | | FREELING | " | 60 | 45 | 35 | 27 | | | | | | |
| | | STRAUSVILLE | " | 60 | 45 | 35 | 27 | | | | | | |
| 11-10-07 | | VERDON | " | †62 | †46 | †36 | 27 | | | | | | |
| | | STELLA | " | 60 | 45 | 35 | 27 | | | | | | |
| *A* | | HOWE | " | 60 | 45 | 35 | 27 | | | | | | |
| | | AUBURN | " | 60 | 45 | 35 | 27 | | | | | | |
| | | NORTH AUBURN | " | 60 | 45 | 35 | 27 | | | | | | |
| | | JULIAN | " | 60 | 45 | 35 | 27 | | | | | | |
| | | PAUL | " | 60 | 45 | 35 | 27 | | | | | | |
| | | NEBRASKA CITY | " | 60 | 45 | 35 | 27 | | | | | | |
| | | WYOMING | " | 60 | 45 | 35 | 27 | | | | | | |
| | | UNION | " | 60 | 45 | 35 | 27 | | | | | | |
| | | MURRAY | " | 60 | 45 | 35 | 27 | | | | | | |
| | | MYNARD | " | 60 | 45 | 35 | 27 | | | | | | |
| | | PLATTSMOUTH | " | 60 | 45 | 35 | 27 | | | | | | |
| | | LA PLATTE | " | 60 | 45 | 35 | 27 | | | | | | |
| | | SOUTH OMAHA | " | 60 | 45 | 35 | 27 | | | | | | |
| | | OAK CHATHAM | " | 60 | 45 | 35 | 27 | | | | | | |
| *C* | | OMAHA | " | 60 | 45 | 35 | 27 | | | | | | |

PRO. NO. 118. PREVIOUS PRO. NO. PAGE 50-1

Attest:
Wm. F. Scott
H. S. Cook

Inventor:
A. W. Standing,
by Geo. N. Knight
Atty.

UNITED STATES PATENT OFFICE.

AMOS W. STANDING, OF ST. LOUIS, MISSOURI.

RAILWAY-TARIFF.

932,827.  Specification of Letters Patent.  Patented Aug. 31, 1909.

Application filed March 21, 1908. Serial No. 422,551.

*To all whom it may concern:*

Be it known that I, AMOS W. STANDING, a citizen of the United States of America, residing in the city of St. Louis and State of Missouri, have invented certain new and useful Improvements in Railway-Tariffs, of which the following is a full, clear, and exact description, reference being had to the accompanying drawings, forming part of this specification.

My present invention relates to an improvement upon railway tariffs shown and described in United States Letters Patent issued to me June 20th, 1899, No. 627358, and which tariff contemplated the displacement in tariff books of tariff sheets by new sheets showing changes in tariff rates or other matters, in order that the tariff books should be kept up to date.

The present invention has in view the production of tariff sheets of the kind set forth in the patent mentioned, in such manner that the user of the tariff may be furnished subsequent to the original issue of the tariff book, with reprinted sheets to be used in lieu of sheets previously present in the tariff book, and which are so marked as to indicate the points at which they are to be introduced into the tariff book, and also so marked as to furnish continuous information to the recipient of the number of other reprinted sheets that have been produced and which should precede any particular reprinted sheet.

The object, therefore, of the present improvement is to provide tariff sheets so marked that each reprinted sheet will serve as a check upon the previously issued reprinted sheets and act as a means of insuring the holders of tariff books that they have at all times been furnished with whatever reprinted sheets have been issued, and that their tariff books are complete to any particular time.

The drawing is a view of a tariff sheet made in accordance with my present improvement.

The tariff sheet shown in the accompanying drawing is in the main printed in accordance with the tariff sheets shown in my patent hereinbefore alluded to, and in so far as the general matter upon these sheets is concerned, there is no necessity for description herein. Mention may, however, be made of the fact that the tariff sheet is provided with a space A in which memoranda may be printed that indicate dates upon which certain altered rates of tariff are effective.

The reprinted sheets of my tariff are numbered according to the number of the original sheets to which they correspond in the tariff book into which they are to be placed, thereby indicating the points at which they are to be inserted into the book and to distinguish them from the original or previous sheets, each reprinted sheet has associated with its number, an auxiliary number or character which indicates that the sheet is a reprinted sheet and not an original sheet. Each reprinted sheet further bears memorandum that it cancels the sheet of the same number which preceded it. The foregoing matter is illustrated at B in the drawing, the example there given being "Page No. 13-2 canceling page 13—1".

In printing the original sheets for tariff books, I print thereupon in addition to the consecutive numbers of the sheets pro numbers which are continued consecutively throughout the entire number of sheets. Therefore, if the tariff book contains 100 original sheets, these sheets will bear in addition to the regular page numbers pro numbers from 1 to 100 inclusive. In producing the reprinted sheets that are to be introduced into the tariff book, I print upon each reprinted sheet, a pro number that will immediately follow the preceding pro number and be consecutive therewith. Therefore, for example, if the original tariff book contains 100 sheets bearing pro numbers from 1 to 100, the first reprinted sheet would bear pro number 101 and the second reprinted sheet pro number 102, thus showing that two tariff sheets had been reprinted to be placed in the original tariff book.

The pro number upon each reprinted sheet is supplemented by printing thereon reference to the number of the page upon which the previous pro number occurred and at with the last reprinted tariff sheet should appear in the original tariff book. Take therefore, the example shown at C in the drawing which reads "Pro number 118 previous pro number 50–1". This example indicates that in the instance of there being 100 original sheets in the tariff book there has been 18 tariff sheets reprinted, the first of which reprinted sheets was numbered pro number 101 and the last pro number 118. Also that the reprinted sheet immediately preceding the last reprinted sheet and which was numbered 117 should be present in the original tariff book at page 50 therein and that it was preceded at this point by another reprinted sheet.

It will be seen that the memoranda printed upon the tariff sheets to be used in the tariff book as herein contemplated, furnish adequate means that will act as a check at all times to insure the user of a tariff book of the number of tariff sheets that have been reprinted and which should be present in the copy of tariff book in his hands. This insurance is based upon the fact that whenever the user of a tariff book receives a reprinted tariff sheet bearing a certain pro number, he may readily trace through his tariff book for the purpose of learning whether all of the previously reprinted sheets have been received by him or not, the only thing necessary to gain this knowledge being backward reference from each last reprinted sheet to the page in the original book at which the sheet of previous pro number appears, and so on from that point by reference to each reprinted sheet to the previous reprinted sheets until he has reached the sheet of the last pro number in the original book.

I claim:

A plurality of consecutively numbered sheets each containing a statement that it cancels a page, said statement reciting the page number of the canceled page and the page number for said sheet, said sheet also containing a memorandum of the page number of the sheet of the next preceding one of the consecutive numbers.

AMOS W. STANDING.

In the presence of—
  LILY ROST,
  BLANCHE HOGAN.